June 11, 1929.  J. C. SHAW ET AL  1,717,326
POWER LIMITING RELAY FOR MACHINE TOOL FEEDS
Filed Dec. 30, 1926  2 Sheets-Sheet 1
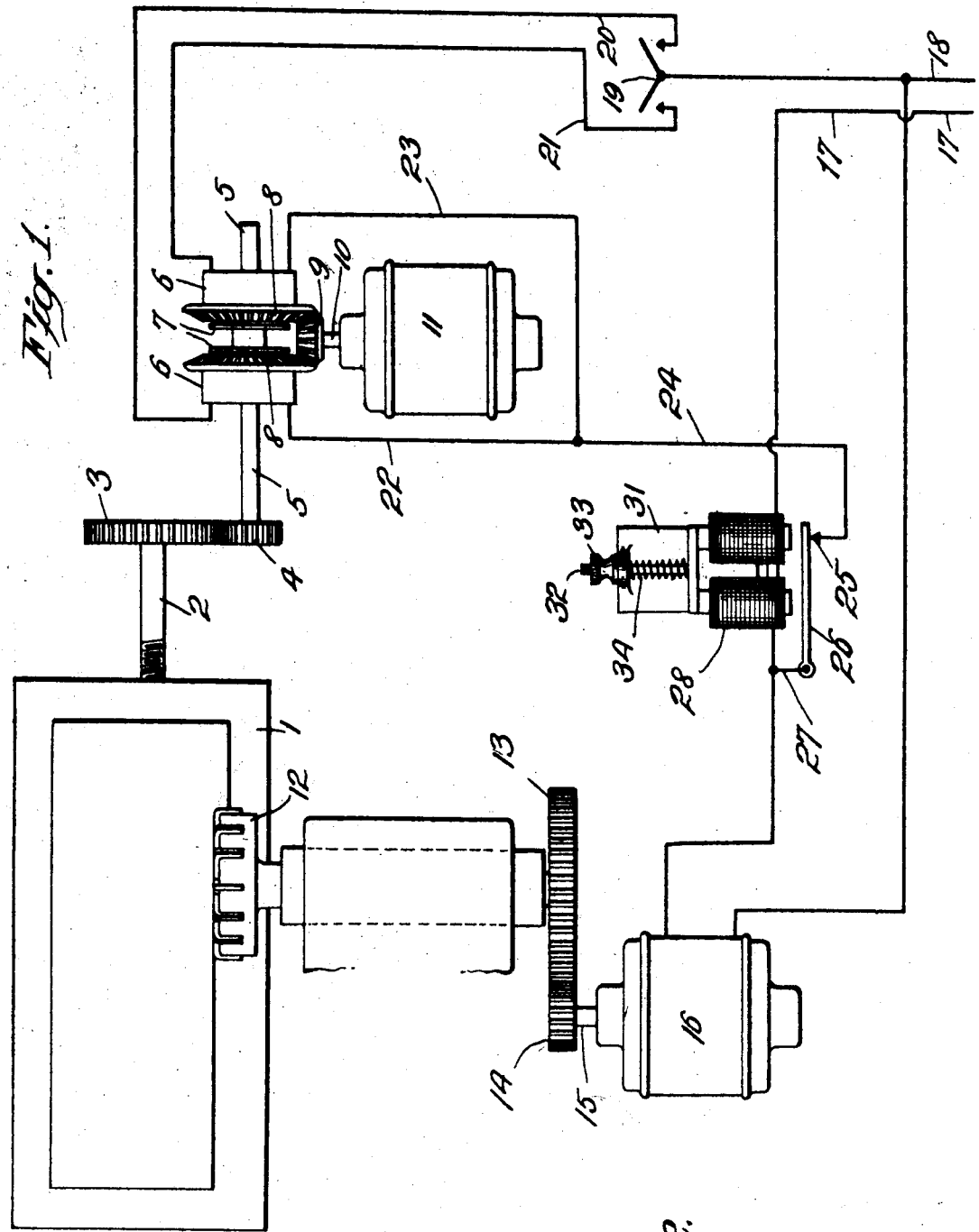
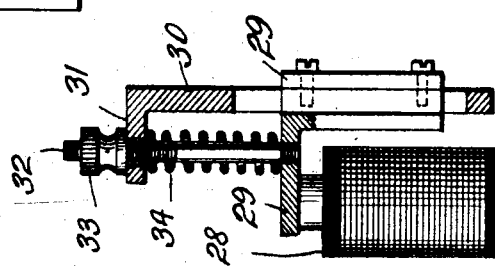
INVENTOR
John C. Shaw and
Robert D. Shaw
BY
ATTORNEY June 11, 1929.  J. C. SHAW ET AL  1,717,326
POWER LIMITING RELAY FOR MACHINE TOOL FEEDS
Filed Dec. 30, 1926   2 Sheets-Sheet 2
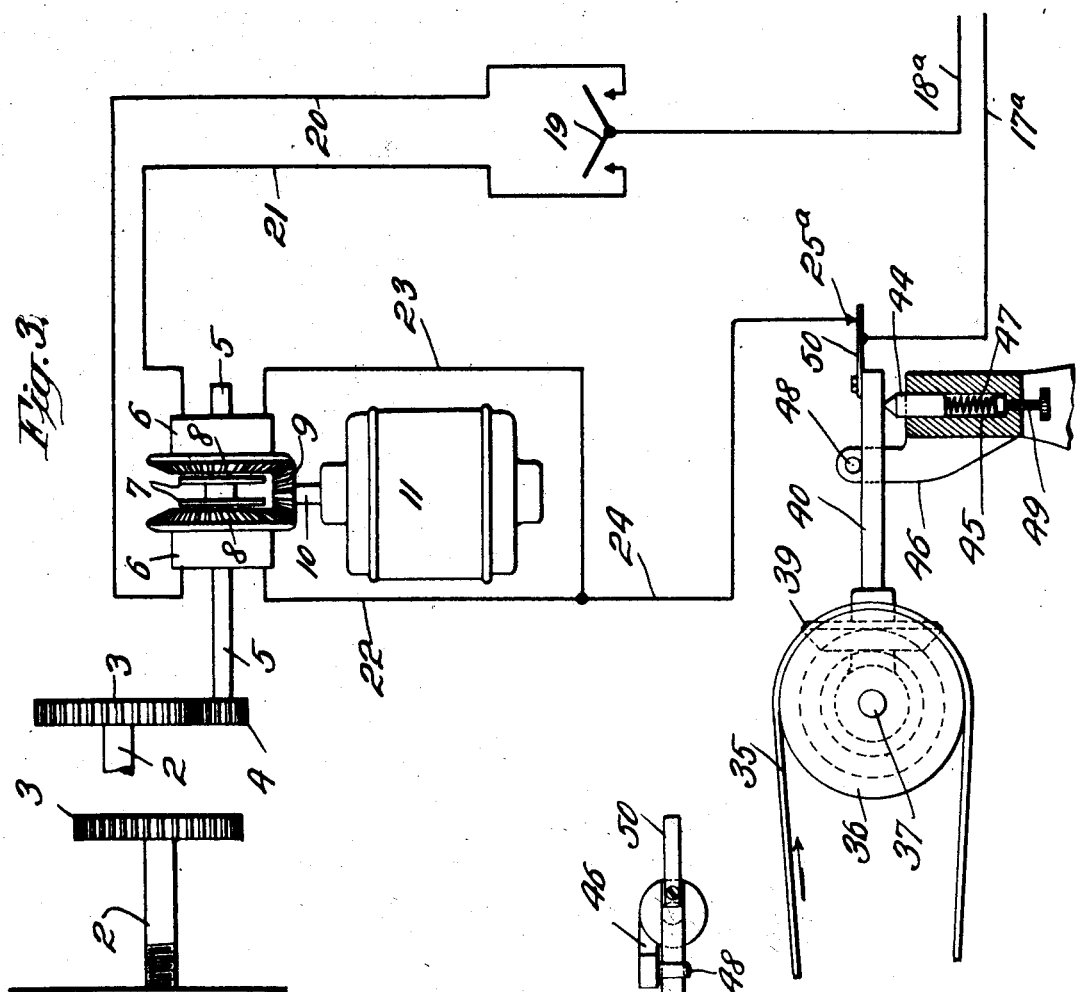
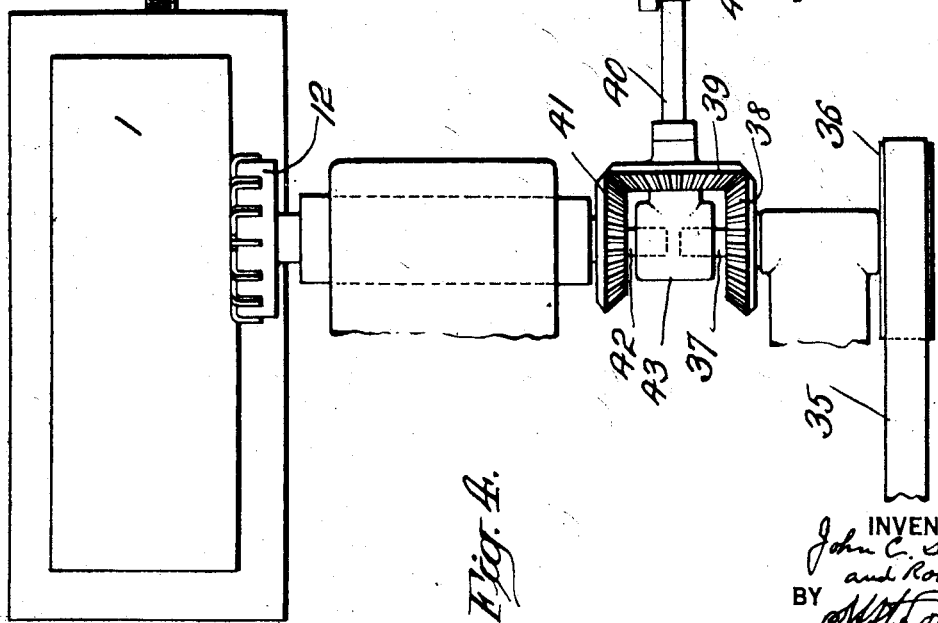
INVENTOR
John C. Shaw
and Robert D. Shaw
BY
W. H. Lockwood
ATTORNEY Patented June 11, 1929.

1,717,326

UNITED STATES PATENT OFFICE.

JOHN C. SHAW AND ROBERT D. SHAW, OF BROOKLYN, NEW YORK, ASSIGNORS TO KELLER MECHANICAL ENGINEERING CORPORATION, OF BROOKLYN, NEW YORK, A CORPORATION OF NEW YORK.

POWER-LIMITING RELAY FOR MACHINE-TOOL FEEDS.

Application filed December 30, 1926. Serial No. 158,121.

Our invention relates more particularly to an improved method of controlling the feed of the work to a rotary cutter, which is power driven, so that the cutting ability of the machine shall not be exceeded and the maximum amount of power is at all times available, the control of the feed being such as to feed the work to the cutter according to its capacity.

In the operation of an ordinary metal cutting machine tool, the amount of cut taken and the speed of feed are ordinarily under the control of the operator. Certain limitations are naturally imposed by the construction of the machine and the ability of the tool to remove metal without destruction of the tool; to rigidity of the structure of the machine to withstand the cutting strain, and the available power which is determined by the capacity of the motor or belt or other power transmitting devices.

Under ordinary conditions, the machine operator has no means of determining how much power is being used except as he is guided, roughly, by the depth of the cut or size of the chip, or further by signs of distress made by the machine, such as various noises, vibration of parts, or slipping of the belt, or in case of motor operation, the opening of the circuit breaker or blowing of fuses.

With the ordinary machine tool, therefore, it will be apparent that the machine operator is compelled to operate the machine well within the limits above referred to, that is, considerably below its maximum capacity. This condition of operation is imperative, for any sudden increase in power consumption will very likely break the tool or cause a shut down of the machine. Where high speed operation of the machine is required and heavy cuts are essential, the above conditions are usually overcome by greatly increasing or over-powering the machine by using a larger motor or an extra-wide belt. This, however, is a dangerous and unsatisfactory course to pursue for it endangers the tool as well as the machine; and frequent breakage will result in delay and loss of time, which, obviously, will add to the cost of production.

In other words, the ordinary machine tool is not provided with any positive method of control, and the operator has no knowledge of exactly how much power is being expended. Therefore, in order to be on the safe side the machine is continuously working below the maximum capacity. Furthermore, he has no means of knowing how much or how little power is required for the job. For example, it may be perfectly feasible to operate a given machine and the cutting tool at a safe continuously applied load of five horse-power, but the operator, having no means of judging the power applied or being utilized, may be operating the machine at a power consumption of only one or two horse-power, which, it will be seen is very much below its maximum capacity. Thus, the ordinary machine is almost invariably operating at a very low-load factor, and, therefore, very inefficiently.

The object of our improved power limiting relay, therefore, is to permit the operation of the machine tool continuously, at a high-load factor and at its maximum cutting capacity and greatest efficiency. For instance if a piece of work involves a cut, a large part of which requires a small amount of stock to be removed, while certain other parts require the removal of a large amount of stock, the operator with the ordinary machine would set the machine to operate for the heavy cut and thus during a large part of the time, the machine would be operating below capacity. On the other hand, with our improved power limiting relay, the machine is set for the full power capacity on the lightest part of the cut and our improved relay automatically controls the feed of the work when the heavier parts of the cut are reached, in a manner to prevent exceeding the capacity of the cutter. Thus our improvement will maintain the operation of the machine well within the maximum amount of power the motor or belt is designed to deliver. In this manner, the machine can be operated continuously under the most efficient conditions of power delivery and capacity of cut.

A further object of our improved power limiting relay is to provide means for adjusting the device to vary the maximum amount of power delivered to the cutter. This feature is particularly desirable for adjusting the power delivered to the capacity of the cutter. Thus a long slender cutter, which would be liable to be deflected or to chatter if forced too much, can be operated at full capacity by adjusting the maximum power limit according to the capacity of the cutter.

It will be understood that various types of transmission dynamometers may be utilized for operatively controlling the feed of the work according to the capacity of the cutter, in connection with our improved automatic control, which preferably includes a magnetic clutch in the power feed of the screw and a contact carrying member for breaking the circuit of the magnetic clutch when the predetermined maximum amount of power is being applied to the cutter. In order to illustrate our improvement, we have shown in the accompanying drawings two forms of our improved power limiting relay. Fig. 1 represents a diagrammatic plan view of our improvement embodying an electromagnet for controlling the feed of the work table; Fig. 2 is a fragmentary sectional view of the adjustable feature of the magnetic relay; Fig. 3 is a diagrammatic view of a modification, in which a transmission dynamometer is used for controlling the feed of the table feed, and Fig. 4 is a plan view of the arrangement of the table and cutter drive, including the transmission dynamometer.

Referring to the drawings, the usual reciprocating work table of a milling machine, or similarly operated machine tool, is represented at 1, which is adapted to be fed longitudinally by the usual lead screw 2, the latter being shown as provided with a gear 3, meshing with a pinion 4, attached to the end of a shaft 5. The shaft 5 preferably extends transversely through a pair of magnetic clutches 6, between which armature discs 7 are mounted, the latter being keyed in the usual manner to the shaft 5. Each of the magnetic clutches 6 carries a bevel gear 8, which meshes with a bevel pinion 9, mounted upon the end of the shaft 10 of an electric motor 11. In this manner, it will be seen that the electric motor 11 is adapted to drive the lead screw 2 through the magnetic clutches 6 and the direction of feed will be determined by energizing one or the other of the magnetic clutches, which being in mesh with the pinion 9, are rotated in opposite directions.

The work which is mounted on the work table 1, is adapted to be operated upon by any suitable milling cutter, such as indicated at 12. The milling cutter 12 is adapted to be power driven in any suitable manner, such as by the gear 13, which meshes with a pinion 14 mounted on the end of the shaft 15 of the electric motor 16, substantially as shown in Fig. 1. The motor 16, driving the cutter, is preferably of limited horse-power, that is, within the capacity of the milling machine or other machine tool, with which our improvement may be associated, and, in order to operate with the greatest efficiency, the motor preferably should be run at full capacity, so as to deliver practically its full rated power. Obviously, when so doing, the cutter or mill will be removing a chip of material, as heavy as the cutter and machine will stand. In order that the motor driving the cutter will not become overloaded, when a heavier cut is to be taken, our improvement provides means for controlling the feed of the table 1, to thereby maintain the feed of the work within the capacity of the cutter and its motor.

For this purpose, the main leads 17 and 18, which convey current to the motor 16 are preferably provided with a branch circuit for energizing the magnetic clutches 6. As shown in Fig. 1, the lead 18 is provided with a double throw switch at 19, adapted to cooperate with contacts on the leads 20 and 21, which convey current to the respective magnetic clutches 6 for direct and reverse feed of the table 1. The circuits through the magnetic clutches 6 are completed through the branch leads 22 and 23, connected with the single lead 24, which as shown in Fig. 1, is attached to a contact point 25, cooperating with an armature contact carrying member 26, which is connected through the lead 27 with the return side 17, of the main line lead, supplying current to the motor 16. An electro-magnet 28 is preferably placed in series with the motor 16 by being connected in the lead 17, and the poles of the magnet 28 are adapted to cooperate with the armature contact carrying member 26, so as to break the circuit to the magnetic clutches 6, when the contact at 25 is broken. Obviously, the amount of current passing through the electro-magnet 28 will be the same as that passing through the motor 16, and hence by adjusting the air gap between the poles of the magnet and the armature contact carrying member 26, the breaking of the contact at 25 can be controlled according to the amount of power delivered by the motor 16, or in other words, according to the amount of current passing through the coils of the magnet 28.

Obviously, variations in the size and shape of the milling cutters 12 will require the application of more or less power, according to the cut the respective cutters are capable of standing without deflection or breaking, and also within the capacity of the machine. Therefore, in order to provide for operation at the full capacity of the cutter and without overloading it, the power applied through the motor 16 is adapted by our improvement to control the feed of the work within this predetermined limit. For this purpose the electro-magnet 28 is preferably slidably or adjustably mounted relative to the armature contact carrying member 26. This construction is more particularly shown in Fig. 2, where it will be seen that a bracket 29 is adapted to support the electro-magnet 28, the bracket being slidably mounted on a supporting back plate 30. The plate 30 preferably is provided with an outwardly projecting lug 31, having a hole for slidably receiving a bolt 32, secured in the bracket 29. A knurled nut 33, mounted on the table started. Thus, so long as the cutter is operating for a heavier cut than the predetermined maximum the feed will be proportionally reduced by the rapid vibration of the dynamometer arm 40, which as previously explained, will rapidly open and close the contact at 25ᵃ and control the feed through the magnetic clutches 6, thus protecting the cutter and the machine from injury or overloading.

It is believed that our improved method and means for operating machine tools at maximum capacity and controlling the feed of the work in accordance with the predetermined maximum amount of power which may be applied to the cutter is novel. We are also aware that various types of transmission dynamometers and relay arrangements may be used and various modifications involving the principles of our improvement may be made in adapting such devices to different types of machines, and, therefore, we do not wish to be limited to the specific details of construction shown, for various changes may be made without departing from the spirit and scope of the invention.

We claim:—

1. In a machine tool, the combination of a power driven rotary cutter, a work carrying table movable relative to the cutter, feeding means for moving said work table, a rotary magnetic clutch for operating said feeding means for feeding the work to the cutter, a continuously operating motor for said clutch and means for intermittently breaking the circuit of said magnetic clutch for rapidly and repeatedly interrupting the feed when the power applied to said cutter reaches a predetermined maximum amount, thereby providing a continuously intermittent feed for maintaining capacity operation without overloading the cutter.

2. The machine tool as claimed in claim 1, in which the means for breaking the circuit of said magnetic clutch comprises a contact carrying member normally urged to close the contact but adapted for movement to open the contact by the power applied to the cutter as said power reaches the predetermined maximum amount.

3. The machine tool as claimed in claim 1, in which the means for breaking the circuit of said magnetic clutch comprises a contact carrying member adapted for movement to open the contact and break the circuit by the power applied to the cutter as said power reaches a predetermined maximum amount and means is provided for adjustably varying the amount of power required to open said contact so as to vary said predetermined maximum.

4. In a machine tool, the combination of a rotary cutter, power means for rotating said cutter, a work table movable relatively to said cutter for feeding the work thereto, feeding means for moving said table, a continuously operating motor for driving said feeding means, magnetic clutches between said motor and the feeding means for direct and reverse feed motion of said table, a contact carrying member resiliently urged for closing the circuit for energizing said clutches and means operative by the power rotating the cutter for moving said contact member and breaking the clutch circuit for intermittently interrupting the feed when the power applied to said cutter reaches a predetermined maximum, whereby there is provided a continuously intermittent feed under full power of the clutch motor, said feed being within the capacity of and controlled by the power applied to the cutter.

5. The machine tool as claimed in claim 4, in which the power means for rotating said cutter comprises an electric motor of predetermined capacity and an electric magnet in series therewith is adapted to move said contact carrying member in opposition to a spring for momentarily breaking the clutch circuit and interrupting the feed when the current to the motor reaches a predetermined maximum, the feed thereafter being continuously intermittent as a result of the rapid opening and closing of said contact.

6. In a machine tool, the combination of an electric motor, a rotary cutter driven thereby, a work table adapted to feed the work to the cutter, power means for feeding said table, magnetic clutches operated by said power means, a lead screw adapted to be operatively connected with the power means through said magnetic clutches for direct and reverse feed of said table, a contact carrying armature normally urged to close the contact and adapted for intermittently opening and closing the circuit for energizing said clutches and an electric-magnet in the circuit of said motor for operating said contact carrying armature to break the clutch circuit when the current to the motor reaches a predetermined maximum, thereby limiting the power applied to the cutter by successive rapid interruptions of the circuit energizing said magnetic clutch and correspondingly interrupting the feed.

7. The machine tool as claimed in claim 6, in which means is provided for measurably adjusting the relation between said electromagnet and the contact carrying armature, so as to vary the maximum amount of power that may be delivered to said cutter by the motor before the contact is broken for intermittently interrupting the circuit of said clutch.

JOHN C. SHAW.
ROBERT D. SHAW.

end of the bolt 32, is provided for adjusting the magnet 28 up and down relative to the armature 26, as indicated in Fig. 1 of the drawings. A spring 34 is preferably inserted between the lug 31 and the bracket 29 to facilitate the movement of the magnet 28, when the nut 33 is turned to lower the magnets and shorten the air space.

The operation of the power limiting relay thus far described will be readily understood, but it will be evident that the power to be applied to the cutter should first be determined by the size and strength of the cutter and the depth of cut desired. When this has been determined, the magnets 28 of the power limiting relay should be adjusted up or down to increase or decrease the air gap between the magnet and the armature contact carrying member 26, according to the predetermined limit of power the cutter will stand. After this adjustment has been made, the machine will operate normally for the ordinary depth of cut, but as soon as the cutter strikes a portion of the work requiring a heavier cut, the current increase to the motor 16 will exceed the predetermined maximum amount and this will so energize the magnet 28 that the lines of force will increase sufficiently for the armature 26 to be attracted across the air gap, thus breaking the contact 25 and deenergizing the magnetic clutch 6, which is feeding the work to the cutter. From that time on, while the cutter is operating for a cut heavier than normal, the feed of the table 1 will be intermittent because of the constant rise and fall in the strength of the power current passing through the magnet 28, which will cause the armature contact carrying member 26 to be rapidly vibrated. This will produce a substantially constant feed of the work toward the cutter, but at reduced speed and always within the capacity of the cutter. In this manner, the machine and cutter can always be operated to the full capacity and with the greatest efficiency without endangering the cutter, the work or the machine.

It has been previously stated that our improved power limiting relay may be operated in connection with the usual or any preferred type of transmission dynamometer and for the purpose of illustration, we have shown in Figs. 3 and 4 how our improvement may be utilized in connection with an ordinary type of bevel gear transmission dynamometer. In this form, the cutter 12 is preferably driven by a belt 35, passing over a pulley 36, secured to the end of a shaft 37 which carries a bevel gear 38. The bevel gear 38 meshes with a bevel gear 39, at right angles thereto and rotatably mounted upon a rod 40. which forms the dynamometer indicating arm. The bevel gear 39, in turn, meshes with a bevel gear 41, which is in axial alignment with the bevel gear 38, and is secured to the shaft 42 driving the cutter 12. The dynamometer arm 40 is provided with a pivotal bearing head 43, which is rotatably mounted upon the ends of the shafts 37 and 42, substantially as indicated in Fig. 4. It will thus be seen that rotation of the bevel gear 38, clockwise, will tend to carry the intermediate bevel gear 39 downward, and hence tend to move the dynamometer arm 40 downward, but this movement is, in the present instance, prevented by a plug 44, slidably mounted in a socket 45 in the supporting bracket 46 and the plug is held against the thrust of the arm 40 by means of a spring 47, which preferably has been properly calibrated. The upward movement of the dynamometer arm 40 is limited by a pin 48, as indicated in Fig. 3. The upward thrust of the calibrated spring 47 may be adjusted by a screw 49, to thereby vary the maximum power transmitted through the dynamometer, which will be required to operate the dynamometer arm 40 and move it downward against the thrust of the spring 47.

The outer end of the dynamometer arm 40 is provided with a contact carrying finger 50, adapted to cooperate with a contact point $25^a$, corresponding to the contact 25 of the form shown in Fig. 1. In this case, the corresponding lead $17^a$ is connected to the contact finger 50 and the lead $18^a$ leads to the same two pole switch 19. The motor and clutch arrangement and connections for controlling the feed of the work table 1 are substantially the same as those shown in Fig. 1 and the corresponding parts are given the same reference numerals. In Fig. 3, the pinion 4, which meshes with the gear 3 and drives the shaft 2, is the same as that shown in Fig. 1, but for the purpose of illustration, the shaft 2 is broken away as shown in the plan view in connection with the table in Fig. 4.

In the transmission dynamometer form of our improvement, the operation will be substantially the same as that previously described for the electro-magnet relay, except that the adjustment for the maximum limit of power to be applied to the cutter, before the interruption of the feed of the work, is obtained by adjusting the tension of the calibrated spring 47. Thus, it will be seen that normal operation of the cutter, driven by the belt 35 through the transmission dynamometer gears 38, 39 and 41, will be maintained so long as the predetermined capacity of the cutter is not exceeded, but as soon as the cutter encounters a heavier cut, more power will be transmitted and the dynamometer arm 40 will be forced downward against the tension of the calibrated spring 47 thereby breaking the contact at $25^a$ and stopping the feed of the table 1. The moment the feed of the work toward the cutter ceases, the excess power through the transmission dynamometers will drop and immediately the contact $25^a$ will be again closed and the feed of the